April 16, 1957 B. VOUMARD ET AL 2,788,544
MACHINE FOR THE MANUFACTURE OF FLEXIBLE
TUBES OF THERMOPLASTIC MATERIAL
Filed Dec. 30, 1952 4 Sheets-Sheet 4
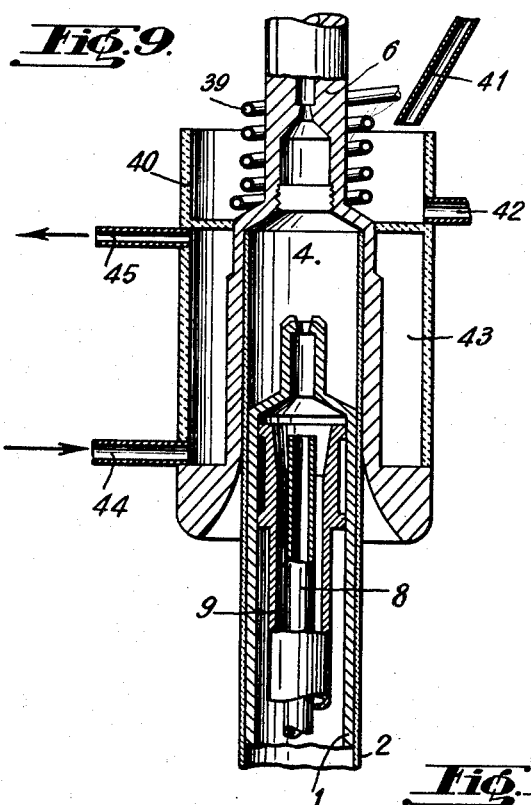
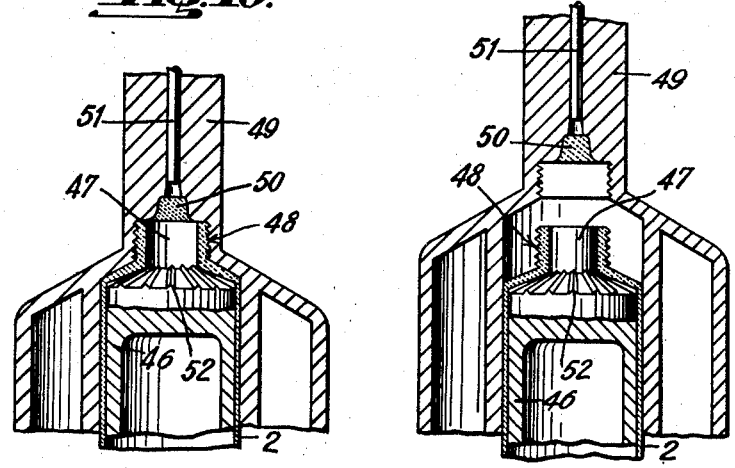
Inventors
Bertrand Voumard
and Paul Monnier
By Munn, Liddy & Nathanson
Attorneys

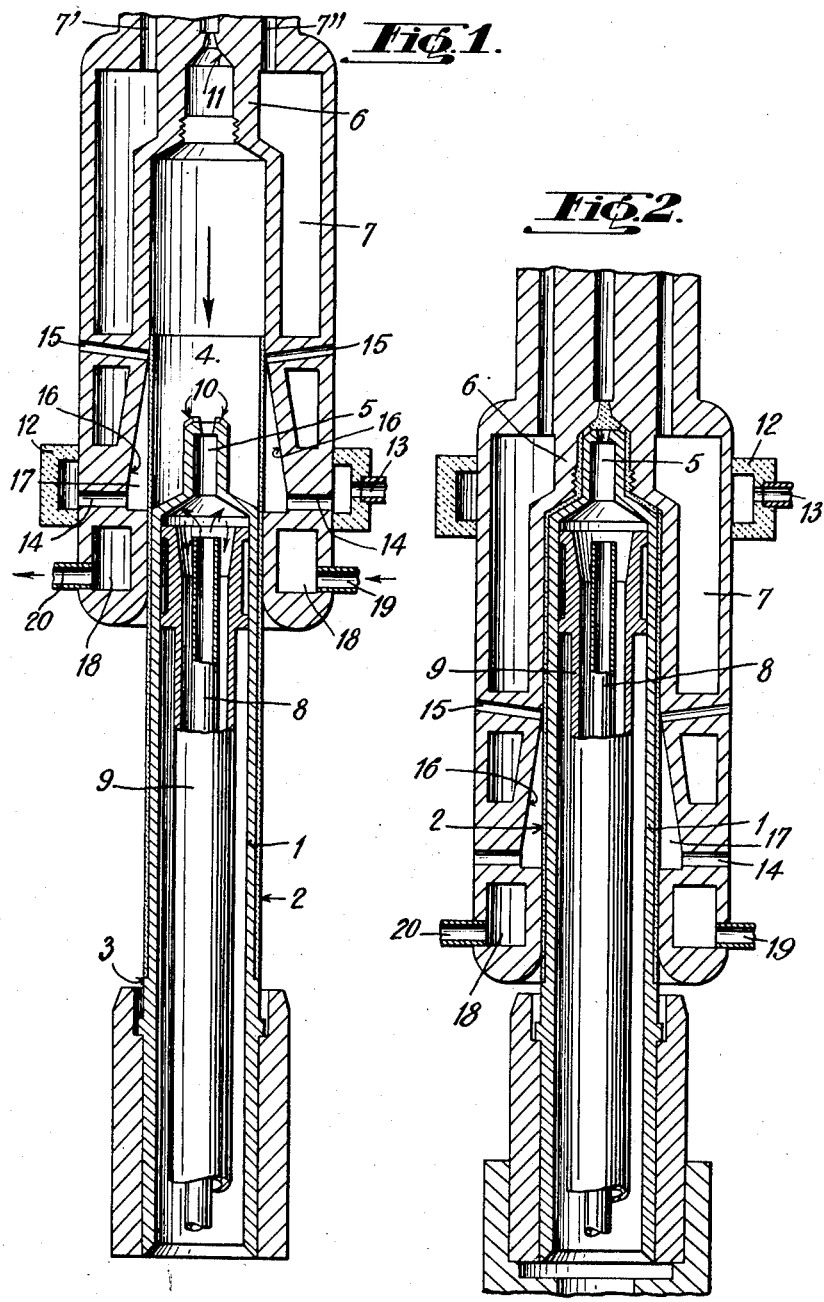

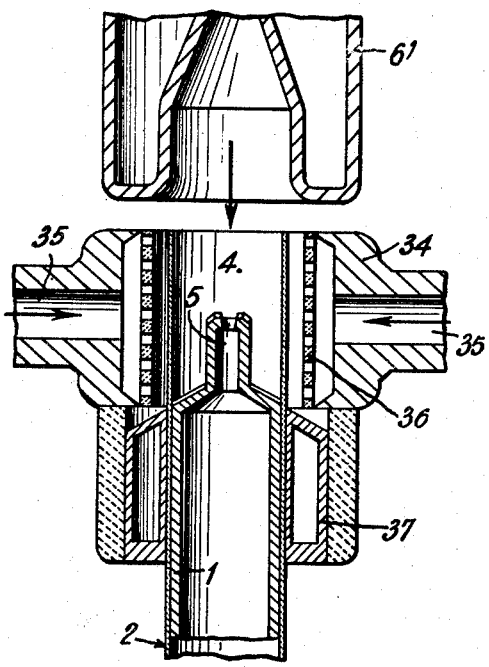
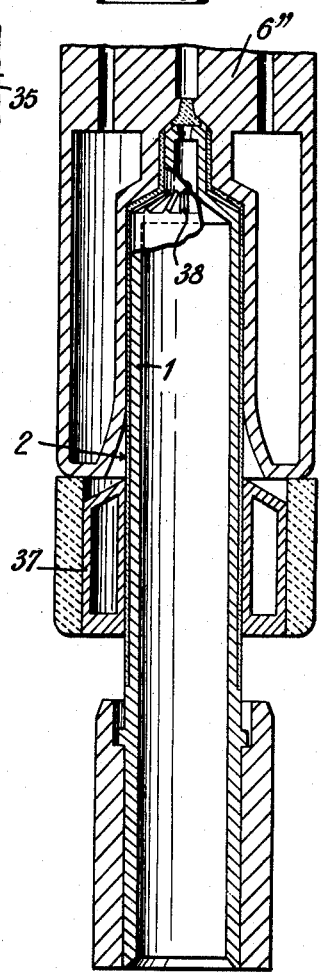
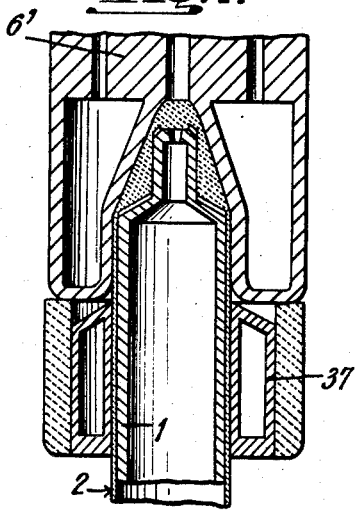

United States Patent Office 2,788,544
Patented Apr. 16, 1957

2,788,544

MACHINE FOR THE MANUFACTURE OF FLEXIBLE TUBES OF THERMOPLASTIC MATERIAL

Bertrand Voumard and Paul Monnier, La Chaux-de-Fonds, Switzerland, assignors to Regoma Company Ltd., Tangier, a corporation organized under the International Zone of Tangier Application December 30, 1952, Serial No. 328,662

Claims priority, application Switzerland October 21, 1952

4 Claims. (Cl. 18—19)

The present invention concerns machine for carrying out a method of manufacture of a flexible tube of thermoplastic material comprising a tubular body and a head destined to receive a stopper. This method consists in fitting a tubular preformed blank on a core, in softening plastic material destined to form the head by heating it, and in fashioning the said head on the end of the tubular blank by moulding the said softened material in a die.

The method consists further in keeping at least that part of the tubular blank which, in the finished article, will be adjacent to the head, at a temperature below that at which the thermoplastic material softens.

The invention includes a machine for carrying out the said method, and comprising a core destined to carry the tubular blank, at least one die for fashioning the head, and heating means destined to bring material which is to form the said head to the temperature at which it softens, in order that a relative movement between the die and the core may cause the said softened material to take on the end of the tubular blank, in the die, the shape of the head of the finished tube.

This machine comprises, in addition, means for keeping at least that part of the blank which is adjacent to the head at a temperature below that at which the thermoplastic material softens.

The accompanying drawing illustrates, by way of example, several modes of carrying out the method according to the invention, and, also by way of example, several embodiments of the machine according to the invention.

Figs. 1 to 3 illustrates a first mode of carrying out the method and show a sectional elevation of part of the machine.

Figs. 6 to 8 are sectional elevations showing part of a second embodiment of the machine and illustrating three phases of the method.

Fig. 9 is a similar view showing a third embodiment.

Figs. 10 and 11 are sectional views showing two different positions of the working parts of a fourth embodiment of the machine.

In the various figures the same parts are indicated by the same references.

Figure 3:
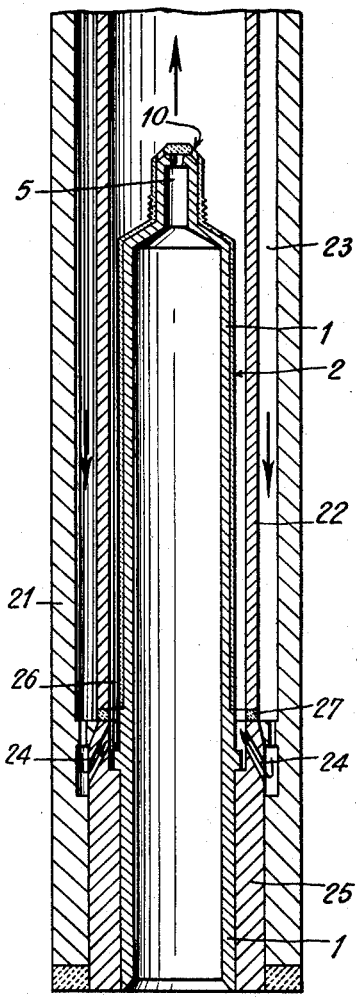

The embodiment of the machine shown in Figs. 1 to 3 comprises a core 1 destined to carry a tubular blank 2 and provided with a shoulder 3 against which the blank 2 rests at one end, in order that a part 4 of the said blank may project beyond the end 5 of the core 1. The machine comprises, in addition, a die 6 for the formation of the head of the tube and provided with a chamber 7 for the circulation of a heating or cooling fluid entering the chamber through the opening 7' and leaving it through the opening 7'', as will be described further on. A tube 8, supplying a heating, respectively cooling, fluid, is mounted concentrically in a tube 9 which is spaced from the wall of the core 1 and opens into the terminal part of the latter.

The end 5 of the core is provided with teeth 10 destined to cooperate with a conical surface 11 of the die 6 and to form outlet openings in the head of the tube.

The die 6 carries an annular collector 12 for a heating fluid which enters through the pipe 13. This collector can either communicate with inlet ports 14 situated in the lower part of the wall of the die 6 (Fig. 1) or can be closed, as shown in Fig. 2, in another position of the die. Above the ports 14, the wall of the die 6 is pierced by outlet ports 15, through which the fluid entering by the ports 14 is discharged. The inner wall of the die 6 comprises a conical part 16 so as to form a space 17 between the said wall and the part 4 of the blank 2. It will be noted that the lower end of the die 6 has a rounded inner edge so as to facilitate the introduction of the blank 2. The said lower end of the die is provided with a chamber 18 for the circulation of a cooling fluid, for example water at a temperature of 20° C., which enters through the opening 19 and leaves by the opening 20, these openings being connected to flexible tubes (which are not shown) so as to allow for the movements of the die.

The manner of executing the method illustrated in Figs. 1 to 3 will now be indicated, together with the functioning of the machine described above.

A tube of thermoplastic material is cut into sections to form tubular blanks the length of which exceeds the length of the finished tube. Each blank 2 is then slipped over the core 1 so that it rests on the shoulder 3 of the said core and has its upper end 4 projecting beyond the end 5 of the core 1. The upper end 4 of the blank is then softened by means of hot fluid (for example air at a temperature of 200° C.) supplied by the collector 12 and entering the space 17 through the ports 14 and leaving it through the ports 15. At the same time, the upper part of the die 6 is warmed up to a temperature which is sufficient to prevent the plastic material from congealing too rapidly when it comes into contact with it (in order to leave the material time to take the shape of the die) but which is nevertheless below the temperature at which the material becomes soft. This is done by means of a fluid, at a temperature of, for instance 50°–70° C., which is run through the annular chamber 7. Meanwhile, the lower end of the die 6 is cooled by the water flowing in the chamber 18.

The purpose of this cooling is to keep at least that part of the blank which, in the finished article, will be adjacent to the head of the tube, at a temperature below that at which the thermoplastic material becomes soft, while the upper part 4 of the blank is being heated.

The end 5 of the core 1 is warmed up to a temperature which is sensibly below that at which the plastic material becomes soft, but which is sufficient to prevent the said material from congealing too quickly when it comes into contact with it (in order to leave the material time to take shape in the die). This is achieved by sending a stream of fluid, for instance air at a temperature of, for instance, 50°–70° C., through the tube 8. This fluid flows to the end 5 of the core and returns, as shown by the arrows, through the space between the tubes 8 and 9.

The die 6 is then moved downwards towards the core 1, and sufficient pressure is exerted on the die to form the upper part 4 of the blank into the head of the tube. During the downward motion of the die from the position shown in Fig. 1 to the position shown in Fig. 2, the collector 12 remains immovable and the circulation of the heating fluid is interrupted owing to the movement of the ports 14 in relation to the said collector, the said ports being then open to the atmosphere. The heating fluid flowing through the tube 8 is then exchanged, for instance, for a cooling liquid and the circulation of water in the chamber 18 is stopped. The heating fluid at a temperature of from 50°–70° C. flowing through the chamber 7 of the die is also exchanged for a cooling liquid at a temperature of, for instance 20° C. When the finished tube has cooled sufficiently, the die 6 (or the core) is rotated in order to unscrew the thread 20 formed on the head of the tube and which is destined to receive a cap.

The die 6 is then removed and a tubular jacket (Fig. 3) is fitted over the core 1 carrying the finished tube. A sleeve 22 is arranged concentrically inside the jacket 21 to form an annular space 23 through which a fluid under pressure flows, as shown by the arrows, towards ports 24 formed in a sleeve 25 supporting the core 1, and through which the said fluid enters the space 26 formed between the finished tube and the sleeve 22. A gasket 27 is placed between the end of the sleeve 22 and the end of the supporting sleeve 25. The fluid under pressure, for instance compressed air, issuing from the ports 24 has the effect of detaching the lower end of the finished tube from the core at the level of the shoulder 3. The compressed air then penetrates between the core 1 and the tube and completely detaches the latter from the core.

Figure 4:
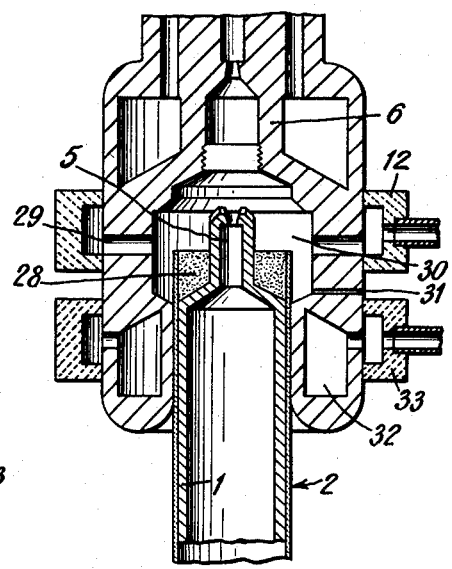
Figs. 4 and 5 are similar views illustrating a second mode of carrying out the method and showing a variant of the machine.
Figure 5:
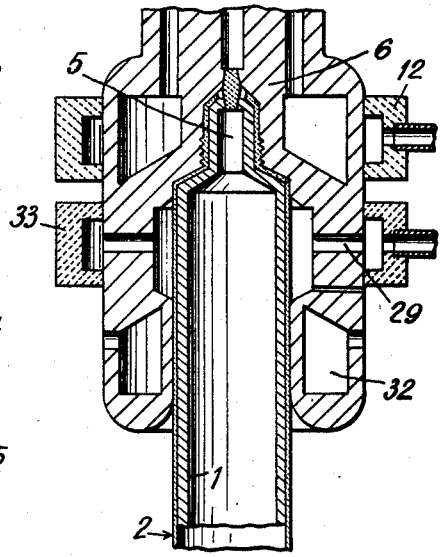

In the machine shown in Figs. 4 and 5, the tubular blank does not project beyond the end 5 of the core 1, additional material 28, in powder form, for instance, being added to form the head of the tube. As in the example previously described, the die 6 carries a collector 12 supplying a chamber 30, surrounding the end 5 of the core, with heating fluid through ports 29. The lower end of the chamber 30 communicates with the atmosphere through narrow ports 31. In order to keep that part of the blank 2 which, in the finished article, will be adjacent to the head of the tube, at a temperature below that at which the material softens, the lower end of the die is provided with an annular chamber 32 for the circulation of a cooling fluid, for instance water at 20° C., supplied through a collector 33. The position of the die shown in Fig. 4 is that which corresponds to the heating up of the material 28. It is in that position that cooling fluid flows through the chamber 32. In Fig. 5 the die has been moved downwards in order to effect the formation of the head of the tube. The collector 12 is cut off and the collector 33 comes opposite to the ports 29, through which the cooling water is now able to flow. The height of the die is notably less than that of the die of the machine shown in Figs. 1 to 3. The various succeeding operations for the formation of the finished tube are the same as those which have been described with reference to Figs. 1 to 3.

In the example shown in Fig. 6 the means for heating the upper end 4 of the blank 2 comprises a removable heating head 34 which surrounds the said part of the blank and is supplied with a heating fluid through the ducts 35. A grid 36, made for instance of heat resisting material, is arranged inside the head to distribute the hot fluid over the upper end 4 of the blank. A cooling ring in which a cooling fluid, for instance water at a temperature of 20° C., circulates (the inlet and outlet for the fluid are not shown) keeps that part of the blank which, in the finished article, will be adjacent to the head, at a temperature below the temperature at which the thermoplastic material softens whilst the upper part 4 of the blank is being heated. When sufficient heat has been applied, i. e., when the upper end 4 of the blank is sufficiently soft, the heating head 34 is removed and the formation of the head is effected in two stages. To that end, a first die 6' is warmed up, as described in the case of Fig. 1, to a temperature of for instance 50°–70° C. which is sufficient to prevent the material from congealing too quickly, but is nevertheless sensibly below the temperature at which the said material softens, and then this die 6' is placed over the softened part 4 of the blank as shown in Fig. 7.

At the second stage, a second die 6', destined to give to the head of the tube its definitive shape, is substituted for the die 6' (Fig. 8), after eventually heating up the thermoplastic material a second time.

As shown in Fig. 8, that part of the core 1 which is situated between the head and the body of the tube is provided with ribs 38. These ribs enable the finished tube to be unscrewed to separate it from the die 6'. A heating head fitted with an electric heating element could be used in place of the hot fluid heating head.

In Fig. 9 the heating means is constituted by a coil 38, formed by a tubular conductor for a high-frequency current, surrounding the die 6. For the intermittent cooling of the die, there is a container 40 surrounding the die and which receives a cooling fluid through the tube 41 when the operation of forming the head of the tube in the die is terminated. The fluid leaves the container 40 through the outlet 42. The upper end 5 of the core is warmed to a temperature which is sensibly below that at which the plastic material begins to soften, but which is sufficient to prevent the material of the upper end 4 of the blank from congealing too quickly when it comes into contact with the said end 5. This is achieved by means of a fluid (air) at a temperature of, for instance from 50°–70° C., supplied through a tube 8 mounted concentrically to a tube 9 inside the core 1, as described in reference to Figs. 1 and 2. An annular cooling chamber 43 receives a cooling fluid, for instance water at a temperature of 20° C., during the whole of the time during which the upper part of the die 6 is being heated. The water enters the chamber 43 through the inlet 44 and leaves it through the outlet 45. In this manner, the wall of the die adjacent to the upper part, which is heated to a temperature of 200° C. for instance, may be kept at a temperature which is sensibly below that at which the thermoplastic material becomes soft, but which is sufficient to prevent the said material from congealing when it comes into contact with the said wall as the die 6 moves downwards. When the head of the tube is being shaped on the upper end 5 of the core 1, the current in the coil 39 is cut off, and the chamber 43 is in the lower position, in which it keeps that part of the blank 2, which in the finished article will be adjacent to the head of the tube, at a temperature which is below that at which the thermoplastic material begins to soften. This method of heating the die by means of a high-frequency current is very rapid and enables the die 6 to be brought to the required temperature in a few seconds. The downward movement of the die must however be sufficiently slow to enable the upper part 4 of the blank to be gradually softened by conduction.

In the example shown in Figs. 10 and 11, the core 46 has a cylindrical terminal part 47 destined to cooperate with the threaded part 48 of the die 49 to form the throat of a tube of the usual type. When the head of the tube is formed in the die, a plug 50 of thermoplastic material forms on the cylindrical terminal part 47 of the core 46. The removal of this plug 50 from the finished tube is obtained by unscrewing the die 49. A pin 51, arranged inside the die, is provided to expel the plug 50 after it has been separated from the tube. In order to enable the die to be unscrewed from the tube, the core is kept immovable and ribs 52, provided on the conical part of the said core, grip the material of the finished tube to prevent it from rotating while the die is being unscrewed. The heating and cooling means are not shown in the drawing. They can be similar to those previously described.

It may be noted that in all the examples described the purpose of keeping the aforementioned part of the blank at a temperature below that at which the thermoplastic material begins to soften, is to enable to make use of a preformed tubular blank the uniform thickness of which is guaranteed. By means of the said cooling effect, the said part of the blank is prevented from being deformed and from becoming irregular in thickness.

What we claim is:

1. A machine for manufacturing a flexible tube of thermoplastic material having a tubular body and a head on the body for receiving a stopper comprising a die, said die having a chamber adapted to slidingly receive a core and a blank forming the tube, a core, said chamber having an inner end in the shape of the head of the tube to be formed, said chamber being formed by a wall-like member, a second chamber formed in said die, said second chamber being formed in part by a first portion of said wall-like member at said inner end, a second portion of said wall-like member adjacent said first portion of said wall-like member, a third chamber, said third chamber being formed in part by a third portion of said wall-like member adjacent said second portion of said wall-like member, first means for introducing a fluid having a temperature below the molding temperature of a blank received in the first mentioned chamber into said second chamber, second means for introducing a fluid at the molding temperatures of the blank, within the first mentioned chamber along said second portion of said wall-like member, and third means for introducing a fluid having a temperature below said molding temperature into said third chamber.

2. The apparatus of claim 1 in which the portion of the first mentioned chamber formed by said second portion of said wall-like member has a greater periphery than the other portions of said first mentioned chamber with said core having a periphery spaced from the said third portion of said wall-like member a distance equal to the thickness of the blank to be used with said machine.

3. The apparatus of claim 1 wherein said core has an outer end facing said inner end and formed complementarily to the said inner end, and duct means within said core adapted to transmit a heating fluid to said outer end for one period of time and a cooling medium for another period of time.

4. A machine according to claim 1, including means slidable with said core with respect to said die comprising a chamber connectible to said second means to supply fluid to said second means when in alignment therewith and being slidable into and out of alignment with said second means as said core moves relative to said die.

References Cited in the file of this patent
UNITED STATES PATENTS

| | | |
|---|---|---|
| 2,169,315 | Yngve | Aug. 15, 1939 |
| 2,313,031 | Parkhurst | Mar. 2, 1943 |
| 2,403,042 | Bogoslowsky | July 2, 1946 |
| 2,419,864 | Westin | Apr. 29, 1947 |